United States Patent [19]

Meis et al.

[11] Patent Number: 4,674,681
[45] Date of Patent: Jun. 23, 1987

[54] IRRIGATION SYSTEM AND APPARATUS

[75] Inventors: Charles H. Meis, Albion; David A. Siekmeier, Columbus, both of Nebr.

[73] Assignee: Lindsay Manufacturing Co., Lindsay, Nebr.

[21] Appl. No.: 761,393

[22] Filed: Aug. 1, 1985

Related U.S. Application Data

[63] Continuation-in-part of Ser. No. 737,688, May 28, 1985, abandoned.

[51] Int. Cl.$^4$ .............................................. B05B 3/00
[52] U.S. Cl. ........................................ 239/1; 239/729; 239/739; 239/744
[58] Field of Search ............................. 239/177–177.2, 239/710, 718–721 726, 728, 729, 739, 743, 744, DIG. 1; 285/114

[56] References Cited

U.S. PATENT DOCUMENTS

| | | | |
|---|---|---|---|
| 2,948,306 | 8/1960 | Kuraeff | 285/114 X |
| 3,802,627 | 4/1974 | Seckler et al. | 239/177.2 |
| 3,979,062 | 9/1976 | Christensen et al. | 239/177.2 X |
| 4,011,990 | 3/1977 | Meis et al. | 239/177.2 X |
| 4,249,698 | 2/1981 | Smith et al. | 239/177.2 X |
| 4,508,269 | 4/1985 | Davis et al. | 239/177.2 |

*Primary Examiner*—Andres Kashnikow
*Assistant Examiner*—Kevin Patrick Weldon
*Attorney, Agent, or Firm*—Kinzer, Plyer, Dorn & McEachran

[57] ABSTRACT

This is concerned with an irrigation system or mechanism which is constructed and arranged and intended to water non-circular fields which may be considered polygonal sided intersecting at the corners. The system and method includes the use or combination of two types of irrigation systems, the first a so-called lateral move or free-standing span system and the second, either a so-called center pivot irrigation unit or a lateral move unit. The free-standing span moves along the outside of the field following the edge or border or fence with turns at intersections and the main irrigation unit moves inside of it and is coordinated and connected to it so that at times they overlap and at times they are distended with water, preferably, being supplied to the free-standing span by the main irrigation unit.

24 Claims, 15 Drawing Figures

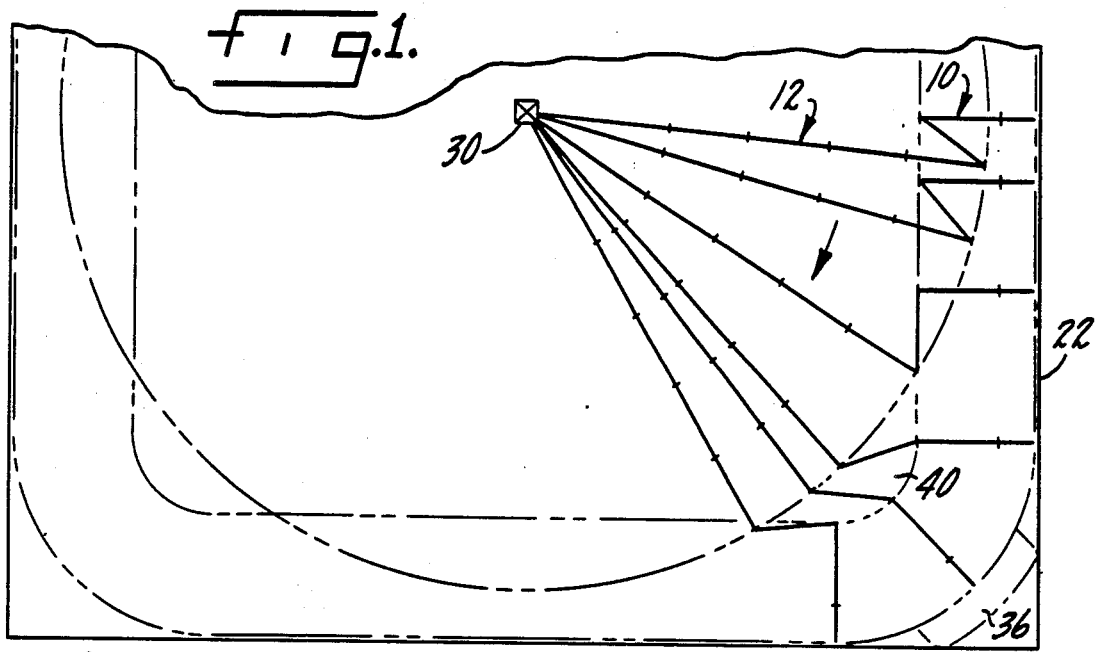
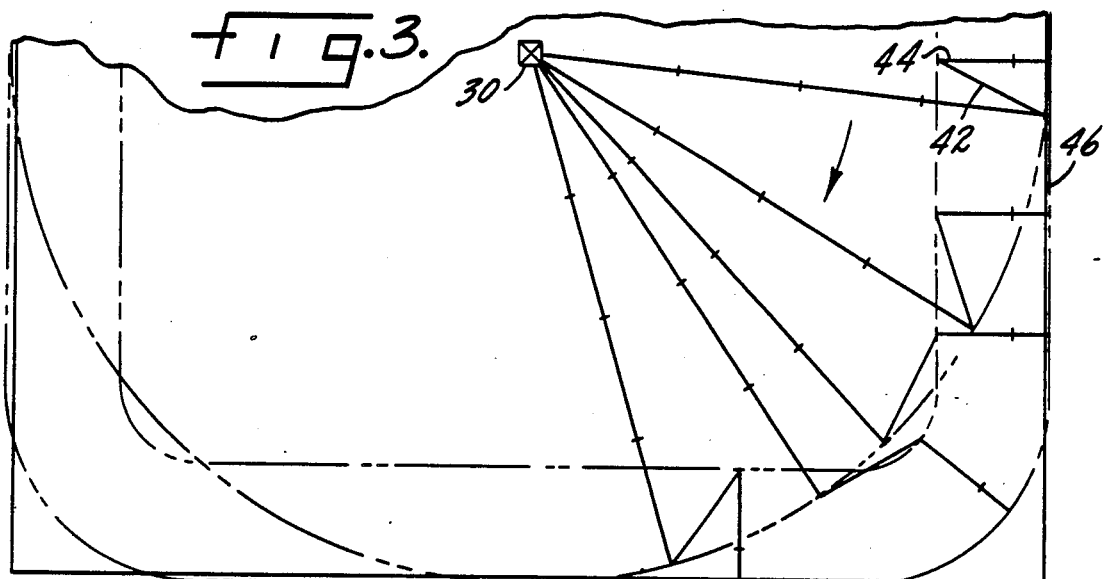
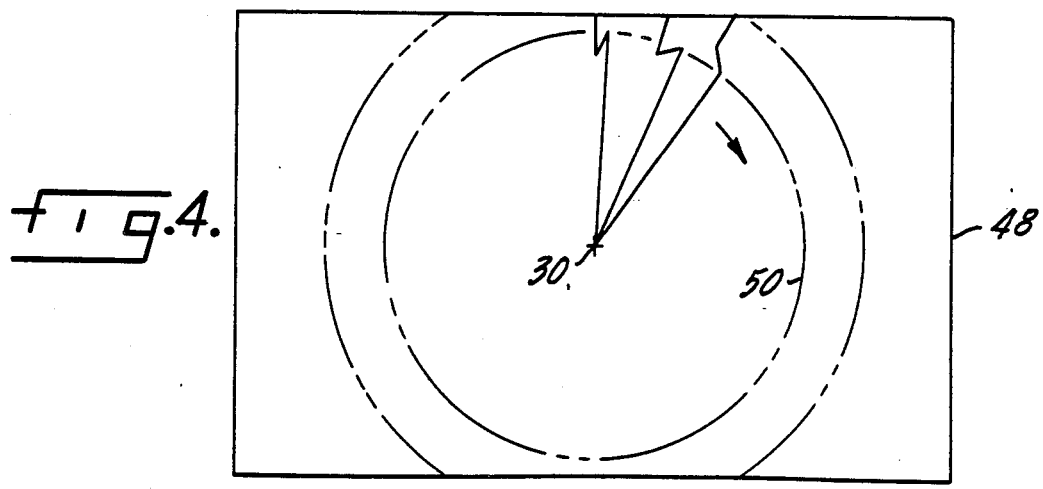

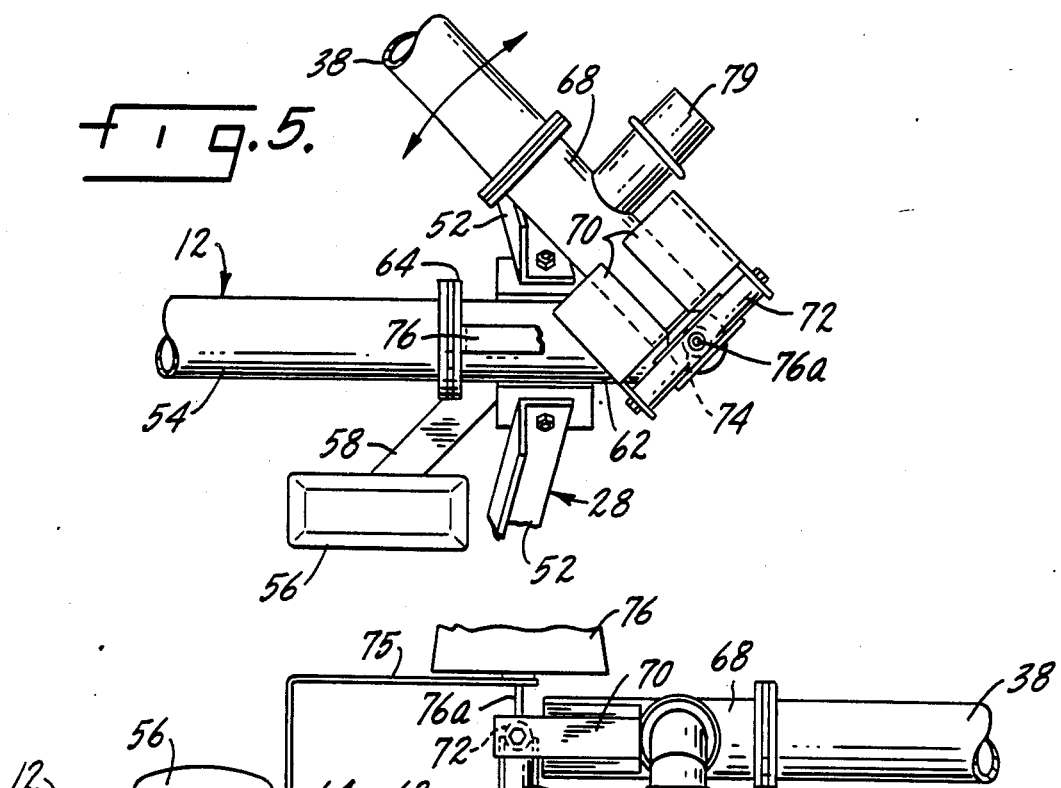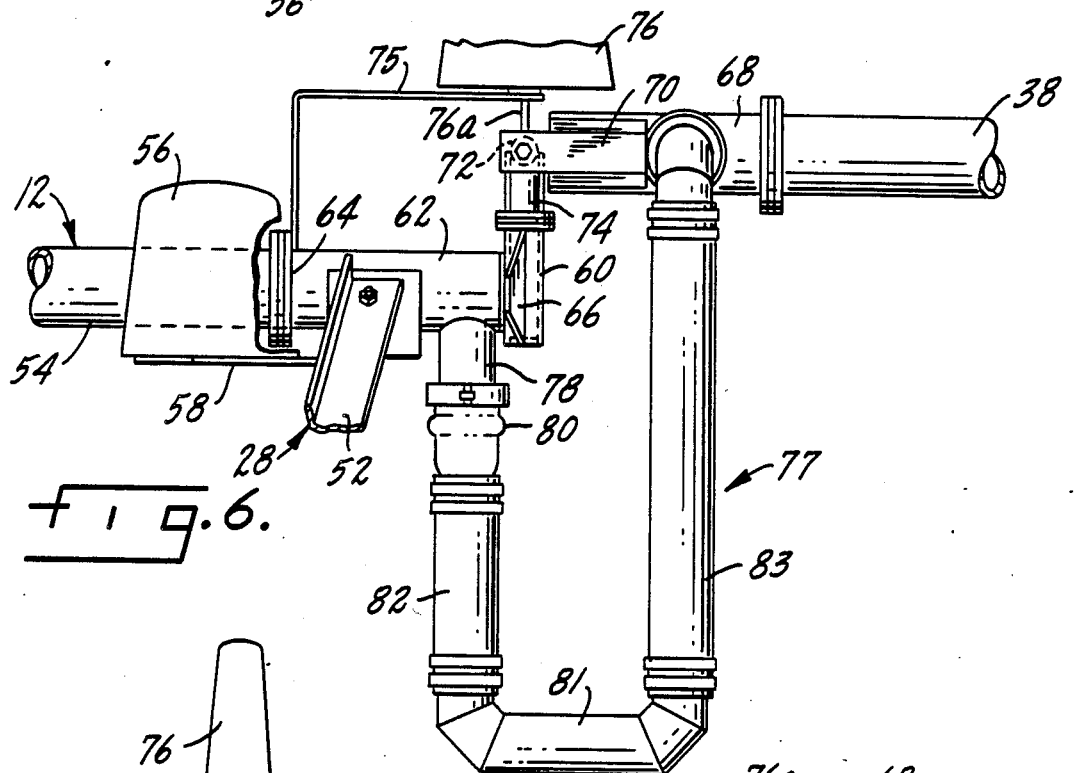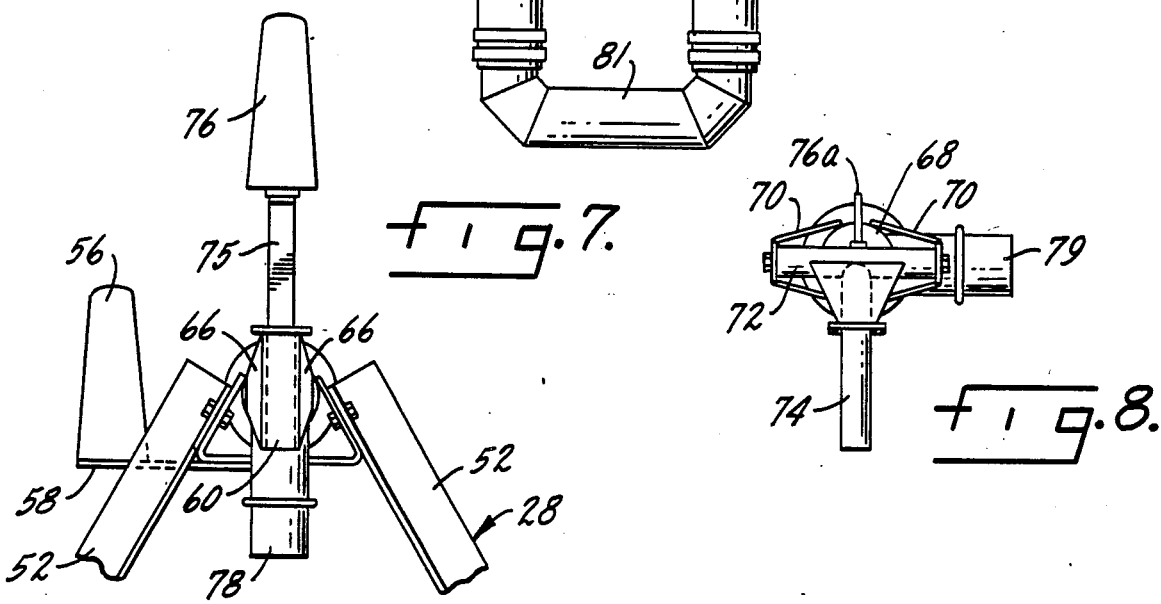

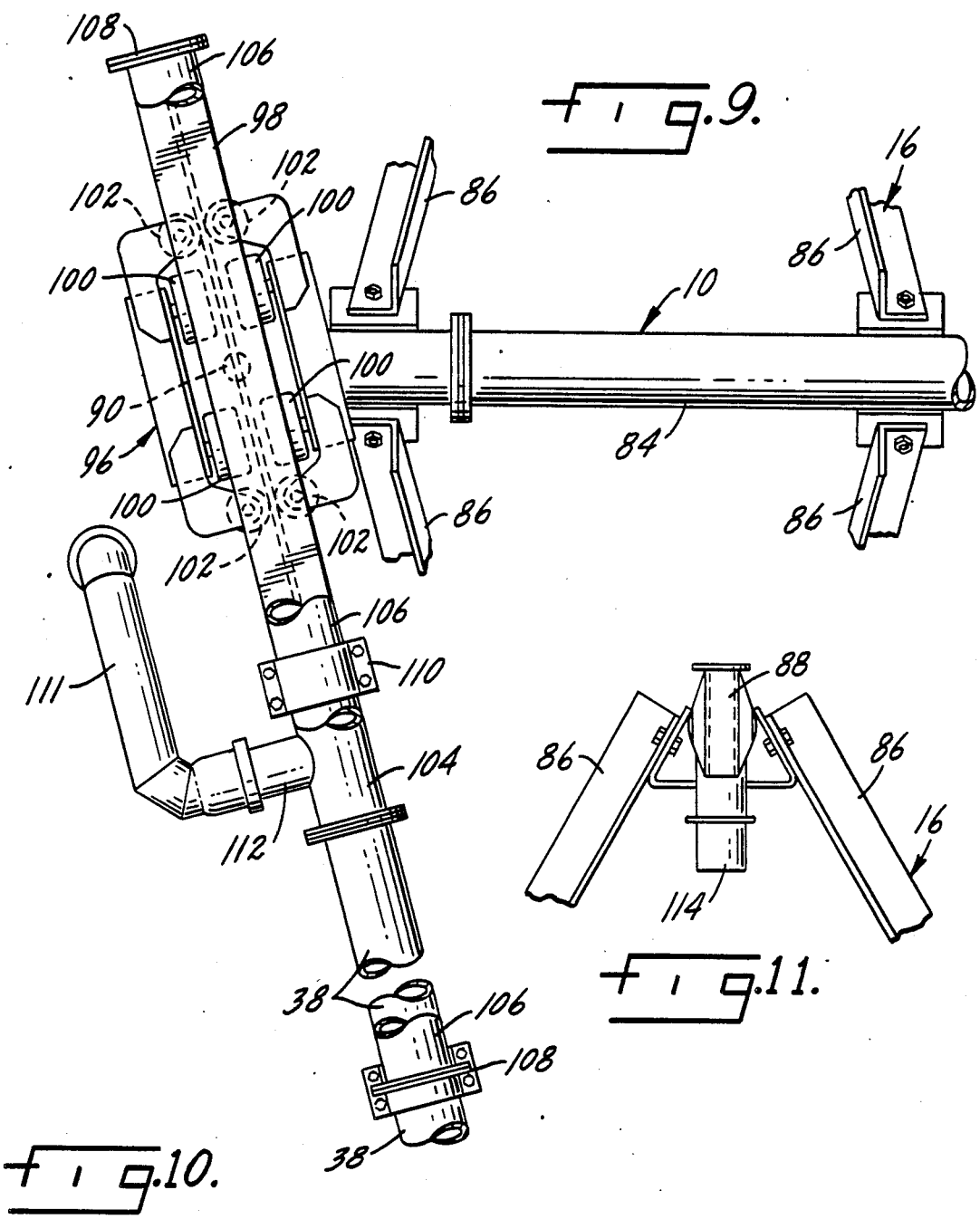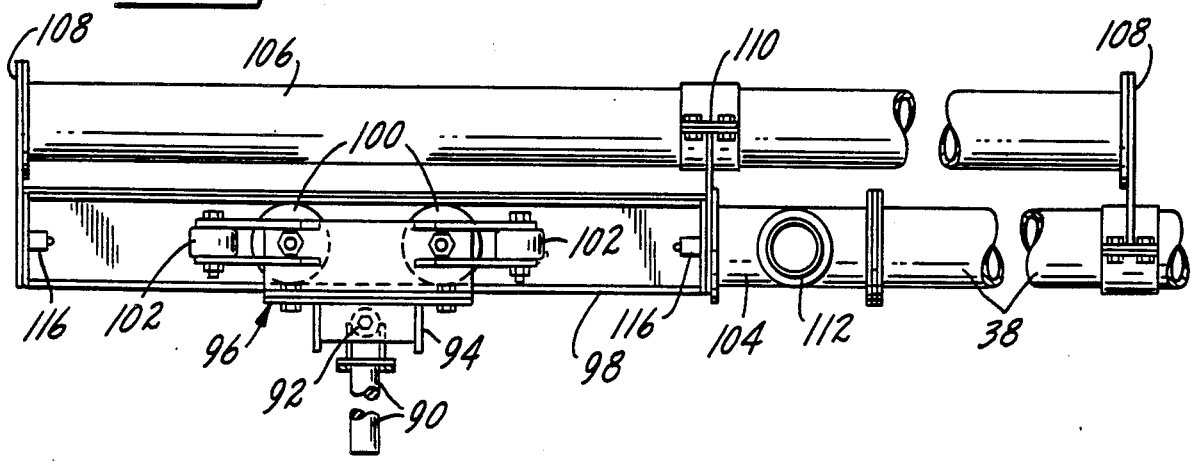

IRRIGATION SYSTEM AND APPARATUS

This is a continuation-in-part of Ser. No. 737,688, filed May 28, 1985, now abandoned.

SUMMARY OF THE INVENTION

This invention is concerned with an irrigation system which is a combination of two known systems, a free-standing span unit and a second main irrigation unit which may be a center pivot unit, combined in a new and unique way.

A primary object of the invention is an irrigation system for a non-circular field such as a square or rectangular or polygonal shaped field.

Another object is a system that will give maximum coverage of such a field.

Another object is an irrigation system or unit of the above type which may be made from common or standard or known parts and does not require any "specials".

Another object is a system of the above type that has a high degree of accuracy and good control.

Another object is a system of the above type which is simple and will be easy to explain to others, such as customers, and will be easily understood by others.

Another object is a system of the above type which does not require any complex controls which is to say it may be used and operated with simple controls.

Another object is a system of the above type which provides maximum capability and may be used effectively and efficiently in an open sided field.

Another object is an irrigation system which is a combination of a free-standing span unit and a center pivot unit.

Another object is an irrigation system which is a combination of a free-standing span unit and a lateral move unit.

Other objects will appear from time to time in the ensuing specification and drawings.

BRIEF DESCRIPTION OF THE DRAWINGS

FIG. 1 is a diagrammatic illustration of a typical system and a portion of its operation.

FIG. 3 is similar to FIG. 1 but of a variant form.

FIG. 4 illustrates a further variant type of operation.

FIG. 5 is an enlargement of the area circled and designated "FIG. 5" in FIG. 2.

FIG. 6 is a side view of FIG. 5 but with the assembly rotated to a different position.

FIG. 7 is an end view of a part of FIG. 6.

FIG. 8 is an end view of the other portion of FIG. 6.

FIG. 9 is an enlargement of the area circled and designated "FIG. 9" in FIG. 2.

FIG. 10 is a side view of a part of FIG. 9.

FIG. 11 is an end view of a part of FIG. 9.

BRIEF DESCRIPTION OF THE PREFERRED EMBODIMENT

Figure 2:
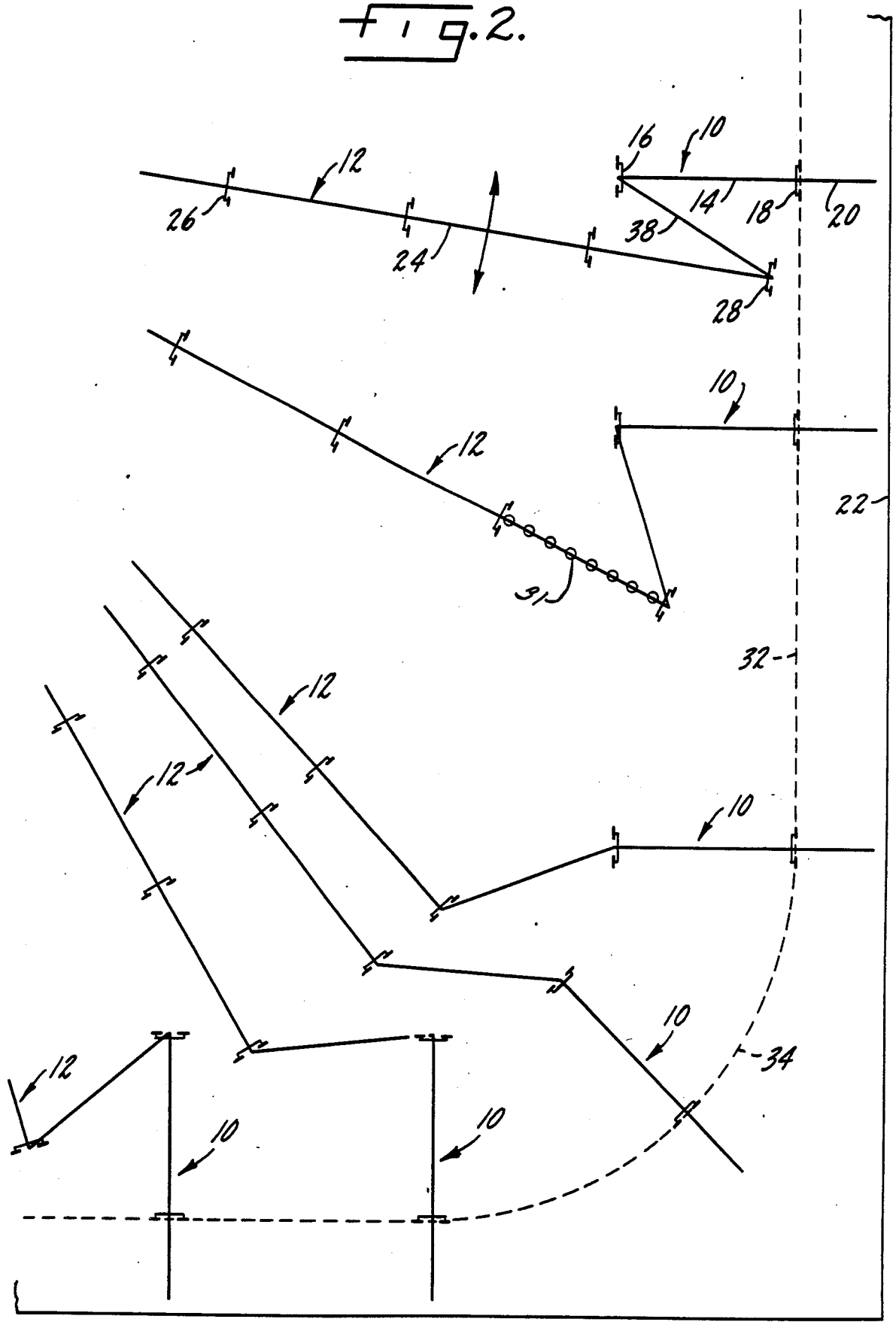
FIG. 2 is a diagrammatic illustration, on an enlarged scale, of a number of operative positions of the FIG. 1 arrangement.

In FIGS. 1 and 2, one form of the system or mechanism is shown and is made up of basically two units, the first indicated at 10 being what is known as a free-standing span and the second indicated at 12 as a center pivot unit. The free-standing span or section is made up of an elongated pipeline 14 with wheel towers at each end, the inboard tower being indicated at 16 and the outboard tower at 18. This is to be distinguished from a unit which has a conventional wheeled tower under only one end of a pivot span. The free-standing span 10 also has an overhang 20 on the outer end thereof which approaches the edge of the field indicated generally at 22 which may be a road, a fence, or what-have-you. The free-standing span including the pipeline 14 between the two towers and the overhang 20 may have sprinklers thereon spaced at suitable intervals, all of which is well-known.

The second unit, the center pivot 12, includes an elongated pipeline 24 supported at intervals on wheel towers 26 with an outer end tower 28 on the end thereof. Conventionally, such a center pivot system is made up of pipe lengths with a tower at the outer end and an articulated joint at the other end, all interconnected with water being supplied from the center location or well or pump 30.

The free-standing span 10 follows a reference line, indicated by the dotted line 32, which is disposed around the perimeter or periphery of the field but spaced inboard somewhat from the edge. The reference line in effect is a series of straight lines interconnected by bends or turns 34 at the corners. The reference line may be either a below ground buried cable type with a sensing mechanism on the free-standing span constructed to follow it, or it may be an above ground reference line or wire with a sensing mechanism on the lateral move unit to follow it such as shown in U.S. Pat. No. 4,330,085, issued May 18, 1982. As shown in the drawing, the sensing mechanism may be on or at the outboard tower 18 of the free-standing span so that, in effect, the outer tower follows the reference line. But it might be at or adjacent the inboard tower 16 or in between. As the free-standing span moves into a corner where the reference line goes through a turn, such as at 34 in FIG. 2, the sensing mechanism will detect the change of direction and will cause the free-standing span to turn through a corner by an appropriate control which may either slow down the rate or movement of the wheels on the inboard tower 16 or speed up the wheel on the outboard tower 18 or a combination of both which will cause the free-standing span to turn through a corner according to whatever radius of turn is desired without any steering or steering mechanism. The free-standing span may also extend opposite the side of a field if desired.

The free-standing span 10 therefore describes a series of generally straight line or rectilinear paths around the outside of the field interconnected by integral bends or turns at the corner with the arc of the turn being tight in the corner so that a maximum of the field is covered or sprinkled or irrigated. As well, the overhang 20 on the lateral move may have an end gun, which is commonly known, which may irrigate an area indicated generally at 36 in the corner which is outside of the path of the free-standing span.

The center pivot 12 is positioned inside of the path of the free-standing span and it may operate as a conventional center pivot operates, meaning that the wheeled towers move around in a circle with sprinklers disposed at suitable intervals along the pipeline irrigating the land in the general shape of a circle. The unit may be conventionally operated with the outermost tower 28 being the master tower controlling movement and sending signals inwardly from one tower to another so that each tower responds and moves in response to signals from the tower outboard of it.

The two systems are connected by a connecting span 38 which may be a pipe that supplies water from the outer end 28 of the center pivot system to the inner end 16 of the free-standing span. The connecting span 38 may be pivoted at each end on the two units so that when the free standing span and center pivot are opposite a side, the connecting span 38 will be folded back in, as shown generally in the top of FIGS. 1 and 2 with the free-standing span 10 behind the outer end of the center pivot in the direction of rotation. It will be understood that normal rotation may be considered to be clockwise in FIGS. 1 and 2. In the next position shown in these two drawings, it will be noted that the free-standing span 10 proceeds on a generally straight line down the side of the field and the center pivot 12 begins to move away from it. This tends to straighten out the connecting span or pipe 38. In the next position in FIG. 2 where the free-standing span is just beginning to enter a curve, the connecting span 38 has moved from a position where it is within the circle of the center pivot to where it is outside the circle. The connecting span 38 may be provided with a series of sprinklers at suitable intervals along its length so that once the connecting span has moved past a point of tangency to the circle described by the outermost tower 28 of the center pivot, the sprinklers on the connecting span 38 may be used to irrigate the small area 40, in FIG. 1, caused by the gap between the outer end of the center pivot and the inner end of the free-standing span opposite a corner.

After the free-standing span has turned through a corner and resumed its generally straight line movement along the next side of the field, the connecting span 38 will reverse its movement and will begin to fold back in behind the center pivot, as shown in the bottom of FIGS. 1 and 2, until it reaches a fully "tucked-in" position opposite the next side of the field.

In the arrangement shown in FIGS. 1 and 2, when the mechanism is opposite the side of the field with the free-standing span following the outer end of the center pivot, it may be desirable to have all of the sprinklers on the free-standing span turned on, the sprinklers on the connecting span 38 turned off, and the sprinklers on the outer end of the center pivot turned off so that the wheels of the free standing span are not moving or churning through wet ground. As the unit begins to approach a corner, the sprinklers on the outer end of the center pivot may be turned on in sequence to cover the entire field. And the sprinklers on the connecting span 38 may be turned on or sequenced in a suitable manner after the connecting span moves beyond a point of tangency to the circle of the center pivot's outer tower 28. According to this method of operation, the free-standing span 10 would have its sprinklers on all the time.

The reverse could be true if the unit was rotating in the other direction so that the free standing span 10 was leading the center pivot. It would probably be desirable to have all of the sprinklers on the center pivot turned on with the sprinklers on the connecting span 38 turned off and only the sprinklers on the outer end of the free-standing span 10 turned on when the system is opposite the side of the field. Thereafter, as it moves into a corner, the sprinklers on the free-standing span could be sequenced on inwardly until they are all on when the connecting span 38 reaches a position of tangency to the center pivot. Thereafter, the sprinklers on the connecting span 38 would come on as the mechanism goes through a corner.

An alternate arrangement is shown in FIG. 3 in which, on a relative basis, the connecting span 42 is somewhat longer so that the free-standing span 44 and its extension tuck in completely behind, or ahead, of the outer end of the center pivot. In this case, the end of the center pivot generally describes a circle that is more or less tangent to the side of the field, as at 46, although there could be some spacing for an end gun to operate, either at the end of the center pivot or the overhang of the free-standing span. The control and the sequencing of the various sprinkler valves could be as before.

In FIG. 4, a further variant has been shown in which the field 48 is somewhat elongated or rectangular. The circle 50 of the center pivot is more or less inboard of the sides of the field. As the irrigation systems begin to move to the long side, the free-standing span would extend to its maximum extension and it would stay in that position, like moving through a long corner, until it came to the other edge of the field where it would move back into its tucked-in position. Thus, the path of the free-standing span would be with top and bottom straight sections and elongated arcs for the two sides.

In FIGS. 5 and 6, an enlargement of the connection between the outer end of the center pivot and the inner end of the connecting span is shown. The angles 52 of the last tower 28 on the center pivot 12 are connected to the end 54 of the last pipe span where the control box 56 is mounted on a suitable bracket 58. The tube 60 is disposed across the end of a short extension 62 with the flanges 64 attached to the end of the last pipe 54. The tube 60 is upright and is in the nature of a socket and is held by brackets or gussets 66 which may be suitably welded thereto. An extension 68 of the connecting span 38 has brackets 70 welded to the end thereof providing a pivot 72 for a pin 74 which is adapted to be mounted down in the socket 60. A support bracket 75 may be connected, for example, for welding, to the flanges 64 so that it overlies the top of the pin 74. A control box 76 is mounted on the bracket 75 over the pin 74. A bolt or rod 76a is socketing in pin 72 and extends up into the control box 76 inside of a potentiometer or the like which will sense the angle between the end of the center pivot 12 and the connecting span 38 to turn sprinklers on and off at appropriate times.

A connection 77 between nipples 78 and 79 on the end of the center pivot and the connecting span to supply water to the connecting span may include a swivel 80 with a metal U tube 81 at the bottom and rubber hose risers 82 and 83 on each side.

In the FIG. 5 showing, the connecting span is shown folded back which would be more or less the position of the unit opposite the side of a field, such as at the top of FIG. 1. In FIG. 6, the connecting span has been pivoted all the way out, for purposes of illustration, and does not represent an operative position.

FIGS. 9 through 11 show the other end of the connecting span 38 where it connects to the pipe 84 of the free-standing span 10. The inner end of the free-standing span is on the tower 16 and attached thereto by the angles 86 in FIG. 9. A socket 88, like the socket 60 in FIG. 6, is mounted on the end of the free-standing span, as shown in FIG. 11, to receive a pin 90, like the pin 74 in FIG. 8 for the other end. The pin 90 is pivoted as at 92 in the bracketing 94 on the bottom of a carriage 96 which fits in an extension 98 which is in the general shape of an I beam which provides roller channels on each side thereof. The carriage has paired rollers 100 on each side which fit inside of the I beam channels, as shown in FIG. 9, with paired end rollers 102 at each end and on each side which bear against the web of the I beam to center and stabilize the carriage. The I beam is in the nature of a track which extends from the end extension 104 of the connecting span 38 and is structurally connected thereto and held in what is otherwise a cantilever arrangement by an upper tube 106 which is connected at each end by a bracket 108 and in between by a brace or bracket 110. A flexible pipe, not shown, is connected through a tube section 111 to a nipple 112 on the extension 104 of the connecting span and another nipple 114 shown in FIG. 11, on the end of the free-standing span. Either one end or the other of the flexible pipe or both may be provided with a swivel joint if desired.

Limit switches 116 may be suitably located on or in the channels so as to be operated or contacted by the carriage 96 at its extremes of movement at each end which is a part of the control to be explained hereinafter.

Figure 12:
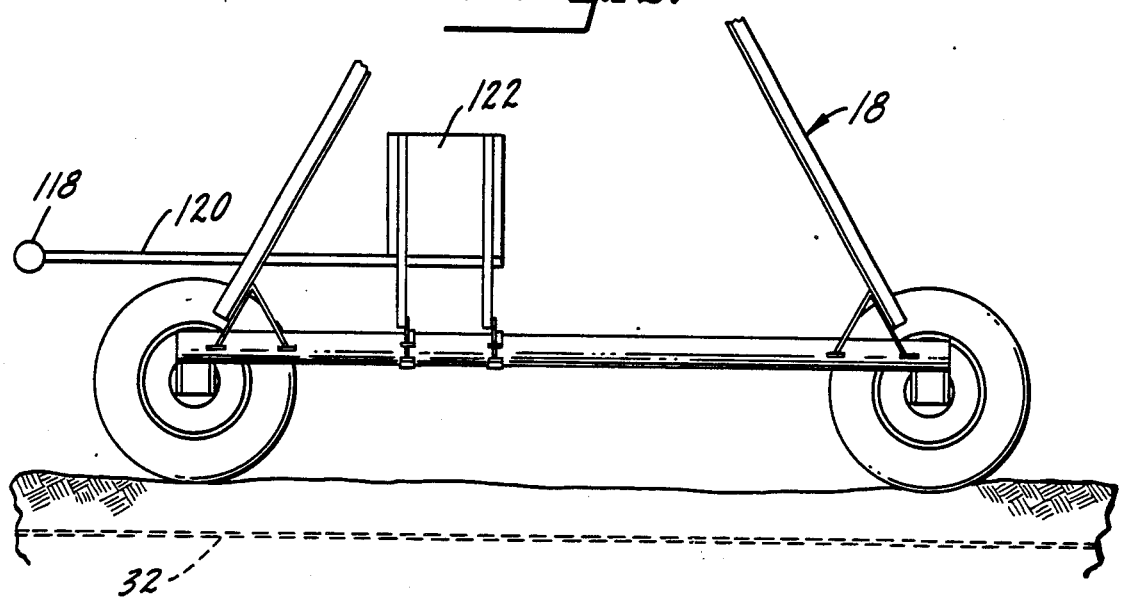
FIG. 12 is a side view of the tower with the guidance mechanism thereon.
Figure 13:
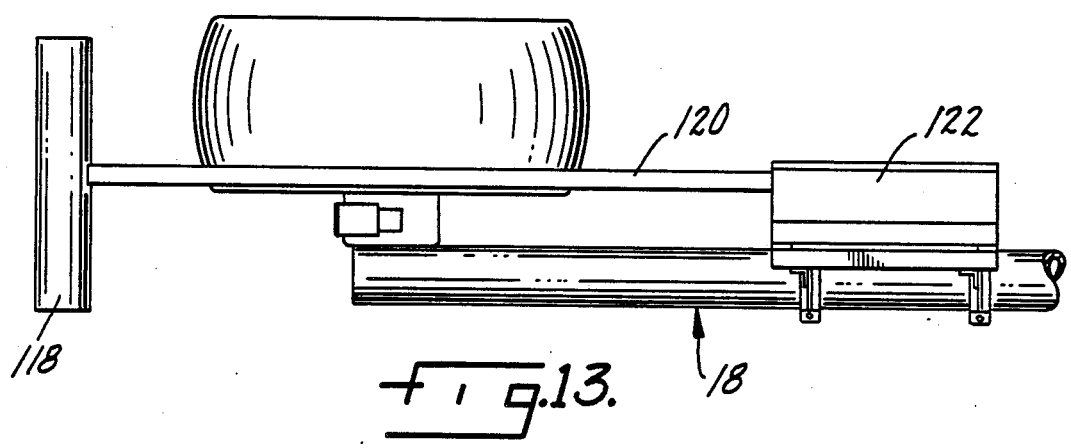
FIG. 13 is an enlarged view of a part of FIG. 12.

In FIGS. 12 and 13, a part of the tower, designated 18 in FIG. 2, is shown following the buried cable 32. Tower 18 includes a sensor 118 projecting forward or rearward on a boom or rod 120 from a control box 122. This sensor 118 senses the field emitted from the buried cable 32 and detects when the unit strays from the cable thereby energizing or de-energizing the drive to the wheels on either the inboard tower 16 or the outboard tower 18 or both on the free-standing span to bring the free-standing span into proper alignment with cable 32. The buried cable thus becomes field coupled to the sensing means to insure guidance of the free-standing span. The details of such a sensor are well known and reference is made to U.S. Pat. No. 3,468,391 as an example of the type of mechanism that may be used.

Figure 14:
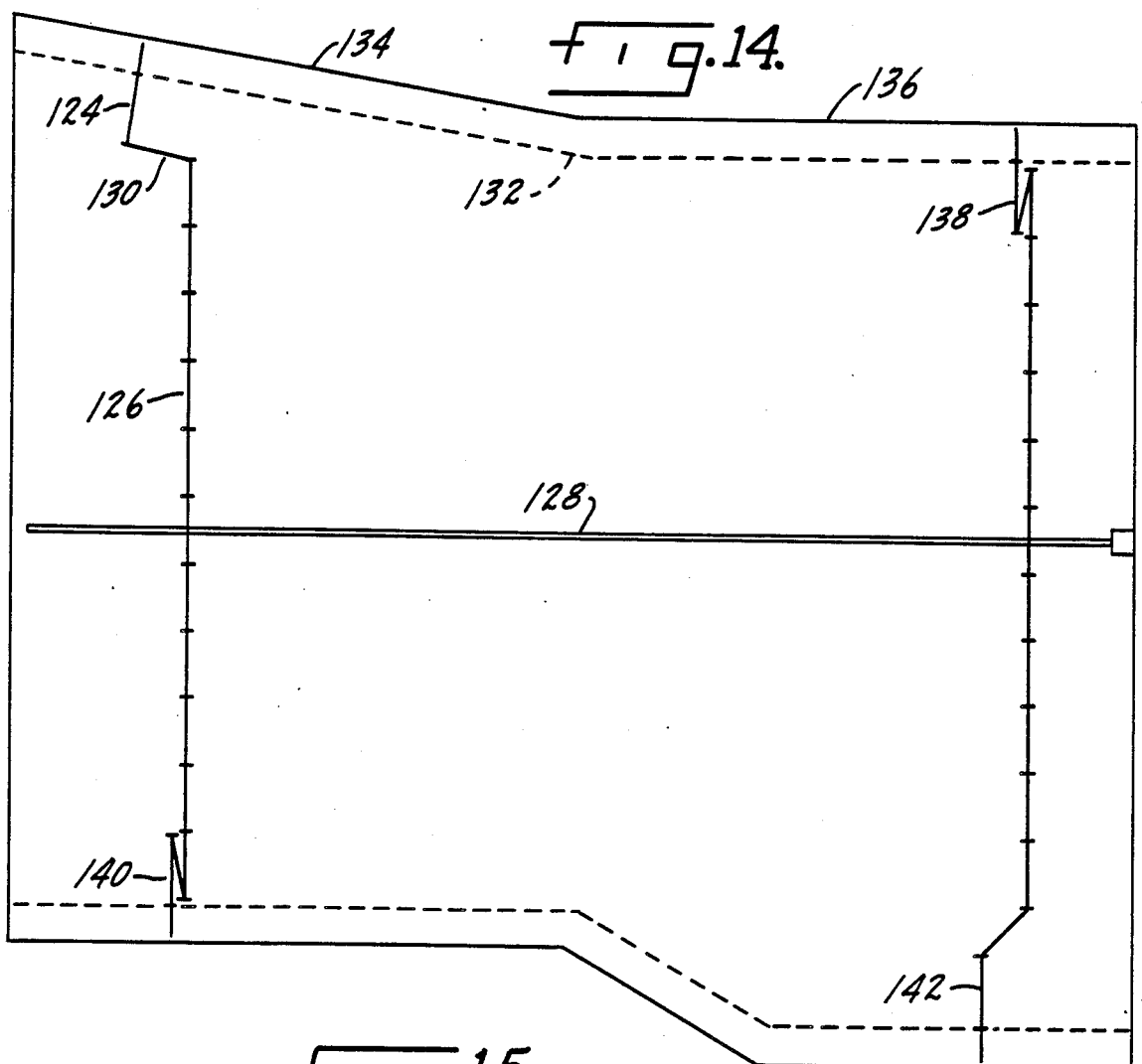
FIG. 14 is a diagrammatic illustration of a further variant.

In FIG. 14 a variant form has been shown in which a free-standing span 124 instead of being connected to the outer end of a center pivot unit is connected to one end of a lateral move unit 126 which includes a series of pipe sections connected by flexible joints with self-propelled towers at intervals to provide a generally rectilinear movement along a field. Such units conventionally pick up water from an elongated source 128 which may be an open ditch or it may be a buried water pipe with risers at spaced intervals and various coupling and uncoupling devices, all of which is old and well-known. The free-standing span 124 is connected to the end of the lateral move 126 by a connecting span 130 which may be the same as before. The free-standing span followed a reference line 132 which may be either above or below ground as explained previously.

It will be noted that the particular field shown in FIG. 14 has an inclined side 134 leading to a straight edge 136 which is generally parallel to the water supply 128. The result is that the free-standing span can be positioned at its maximum or extreme position on the left edge of the field and then will gradually work its way inwardly as the unit moves from left to right until it reaches a fully folded in position when it reaches the straight edge 136 and then follows along behind the lateral move in the position shown generally at 138 until the lateral move reaches the far end of the field and reverses its movement. As explained in connection with the previous forms, the sprinklers on the free-standing span and connecting span may be sequenced on and off depending upon whether the unit is in its extended position, as shown to the left in FIG. 14, or its tucked-in position, as shown to the right. Since it is desirable not to have the wheels of the towers on the free-standing span churn through wet ground, the sprinklers on the free-standing span may stay on and the sprinklers on the outer end of the lateral move may be sequenced off as the free-standing span tucks in behind. When moving in the opposite direction, from left to right in FIG. 14 after the unit reverses, the sprinklers on the part of the lateral move opposite the free-standing span 124 would be turned on and those on the free-standing span and connecting span would be off except for that portion that extends beyond the end of the lateral move. As the unit begins to move along the inclined edge 134, the free-standing span begins to unfold. The sequencing of the sprinklers on these two spans may cause them to turn on accordingly so that the full field is watered.

In the lower part of FIG. 14, another free-standing span 140 has been shown connected to the end of the lateral move which is to illustrate the versatility of the concept. At the same time that the free-standing span at the top of FIG. 14 is folding in during left to right movement, the one at the bottom is already tucked in but begins to move out about halfway in the travel from left to right until it reaches a fully extended position as indicated at 142 at the right in FIG. 14. Any combination might be used. If one side of the field is straight, then a free-standing span might only be used on the other side. And the one side would be conventional.

Figure 15:
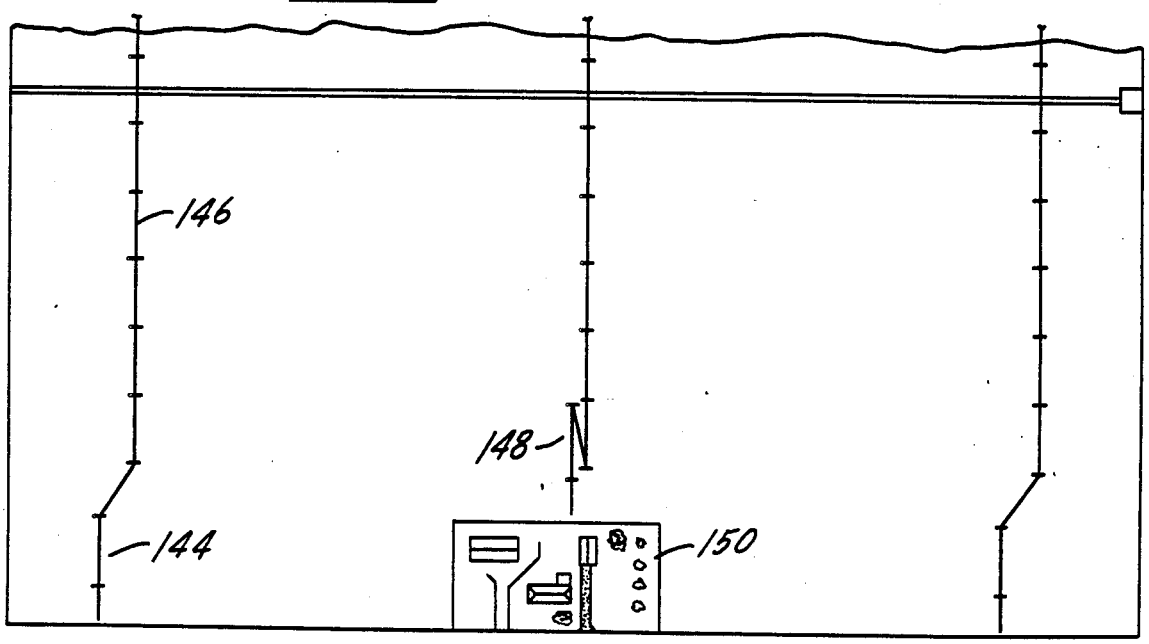
FIG. 15 is a diagrammatic illustration of still a further variant.

In FIG. 15 a variant form has been shown in which the free-standing span 144 on the end of the lateral move 146 is in an extended position on each side of but folds in to the position 148 to clear a farmhouse or dwelling or barns or what-have-you indicated generally at 150. When clear, it folds out again.

An appropriate control would be to have the outermost tower 18 on the free-standing span the master with the sequenced program which from time to time causes the outermost tower to move forward. This in turn would be communicated to the inner tower 16 and cause it to move in unison. This in turn would cause the carriage 96 to slide forward in the channel until it closed the switch 116 which could be connected to activate the outer tower 28 on the main unit and cause it to move forward. This in turn would cause each successive inboard tower to move in the normal manner of either a center pivot or a lateral move.

Or the control might be to have the last tower 28 on the main unit the master and the inboard towers would act in their normal manner. Movement of the last tower 28 would cause the connecting span 38 or link to move, causing the carriage 96 to slide along in the channel until switch 116 at the left is closed which would signal the outer tower 18 on the free standing span to move.

Whereas the slidable connection and switches in FIGS. 9 and 10 have been indicated as being between the outer end of the connecting span and the inner end of the free-standing span, it should be understood that this joint could be put between the inner end of the connecting span and the outer end of the main irrigation unit, in FIGS. 5 and 6 between the outer end of a center pivot and in FIGS. 14 and 15, between the outer end of a lateral move and the inner end of the connecting span. The signalling joint, FIGS. 9 and 10, could be in either location.

The use, operation and function of the invention are as follows:

The system has the advantage that both types of irrigation units are known, both the free standing span and the main unit, be it a center pivot or a lateral move. Each is made up of standard or conventional hardware and the operations thereof are fully known, fully understood and reliable. The invention may be thought of as a free-standing span of a lateral move system chasing along the outside of the field with a conventional irrigation unit inside of it. Suitable sprinkler controls may be used in the areas of overlap, first, so that double watering does not take place and, second, so that the wheels of the trailing unit can be kept from running through the mud. Turning of the free-standing span, for example, at corners has the advantage that no complicated steering mechanism is necessary. The individual control of sprinklers on the various parts which may be electrical and/or hydraulic is well known and well understood.

The connecting span interconnecting the two may serve a double function. First, it supplies water from the main unit to the free-standing span. Second, it may be used to convey signals from one to the other, either in or out. While we have stated that normal sprinkler units may be placed along the connecting span, in certain situations this may not be necessary or desirable. Rather, a pair of end guns may be used, for example, one at the end of the main unit to spray outwardly and another on the inner end of the free-standing span to spray inwardly. This could be sequenced to cover the area in between the two when the free-standing span is extended, for example, the small area 40 opposite a corner. But sprinklers on the connecting span are preferred.

The connecting span in a sense may be a pantograph or follow a pantograph movement and in certain situations might be doubled up. Basically, it provides for or allows migration of the free standing span relative to the main unit.

While the preferred form and several variations of the invention have been shown and described and suggested, it should be understood that suitable additional modifications, changes, substitutions and alterations may be made without departing from the invention's fundamental theme.

We claim:

1. In an irigation system for watering a non-circular area, such as a generally square field, a free standing span including an elongated water pipe with a self-propelled movable tower with non-steerable wheels at each end, a guidance mechanism including a guidance reference line extending around the periphery of the field, a sensing mechansim on the free standing span constructed to follow the alignment reference line, sprinklers on the free standing span for irrigating a path around the outside of the field, a center pivot irrigation unit inside of the free standing span constructed and arranged to move with the free standing span, including an elongated water pipe supported at intervals by self-propelled movable towers with sprinkler units along the water pipe, and a connecting span between the outer end of the center pivot irrigation unit and the inner end of the free standing span so that the connecting span and free standing span may fold in next to and peripherally overlap the outer portion of the center pivot irrigation unit opposite the sides of a field and unfold and extend beyond the outer end of the center pivot irrigation unit in the corners of the field.

2. The structure of claim 1 further characterized by and including sprinklers along the connecting span between the free standing span and the center pivot irrigation unit.

3. The structure of claim 1 further characterized in that the center pivot irrigation system leads the free standing span in their direction of movement.

4. The structure of claim 1 further characterized by and including an overhang extension on the outer end of the free standing span.

5. The structure of claim 1 further characterized in that the alignment reference line includes an electric cable buried in the ground.

6. In an irrigation system for irrigating a field which has one or more non-circular areas, a first irrigation pipe system that includes a free standing span pipe unit with non-steerable wheels and towers on each end and sprinklers thereon arranged to irrigate a path made up generally of straight sections and turns conforming to the outside of the field, a second irrigation pipe system that includes an elongated center pivot pipe unit with sprinklers thereon supported at intervals on wheels and towers and arranged to pivot about a center to irrigate a circular area generally inside of the path defined and irrigated by the free standing span pipe unit, and a connection between the two units that supplies water from the second unit to the first and that also allows substantial differential movement between them while both are moving.

7. The structure of claim 6 further characterized by and including sprinklers on the connection between the two units.

8. The structure of claim 6 further characterized by and including a guidance mechanism for the system including an elongated reference line positioned around the periphery of the field and in predetermined relation thereto.

9. The structure of claim 6 further characterized in that the connection between the two units allows them to be in overlapping relation when opposite the sides of a field and in extended relation opposite the corner of a field.

10. A method of operating an irrigation system to irrigate a generally polygonal shaped field having generally rectilinear sides intersecting at corners, the system including a first free standing span pipe system supported by towers with non-steerable wheels on each end thereof and sprinkler units along its length, and a second elongated center pivot pipe system with sprinkler units along its length supported at intervals by wheel towers, including the steps of positioning the free standing span pipe system adjacent the periphery of the polygonal shaped field, simultaneously sprinkling and moving the free standing span pipe system around the periphery of the field in a series of generally straight line steps with turns where the sides of the field intersect at the corners, positioning the center pivot pipe system in the general center of the field inside of the defined path of movement of the free standing span pipe system, simultaneously pivoting and sprinkling with the center pivot pipe system through a generally circular part of the field, coordinating the inner end of the free standing span pipe system and the outer end of the center pivot pipe system so that they move in unison in overlapping relation opposite the sides of the field and in extended relation opposite the corners of the field, and supplying water from the outer end of the center pivot pipe system to the free standing span system.

11. The method of claim 10 further characterized by and including the steps of defining a reference line around the periphery of the field, and controlling the movement of the free standing span pipe system relative to the reference line around the periphery of the field.

12. The method of claim 10 further characterized by and including the step of supplying water from the outer end of the center pivot pipe system to the inner end of the free standing span system.

13. The method of claim 10 further characterized by and including the steps of sensing the movement of the free standing span pipe system, and causing and controlling the movement of the center pivot pipe system in cooperation therewith.

14. The method of claim 10 further characterized by and including the steps of sensing the movement of the center pivot pipe system, and causing and controlling the movement of the free standing span pipe system in cooperation therewith.

15. The method of claim 10 further characterized by and including the step of positioning the free standing span pipe system behind the outer end of the center pivot pipe system in their direction of movement when they are in their overlapping relation opposite the sides of the field.

16. The method of claim 15 further characterized by and including the step of sprinkling with the free standing span system and not sprinkling with the portion of the outer end of the center pivot pipe system peripheral opposite thereto when they are in their overlapping relation opposite the sides of the field.

17. The method of claim 16 further characterized by and including the step of positioning the free standing span pipe system ahead of the outer end of the center pivot pipe system in their direction of movement when they are in their overlapping relation opposite the sides of the field.

18. The method of claim 17 further characterized by and including the step of sprinkling with the portion of the center pivot pipe system peripherally opposite the free standing span pipe system and not sprinklng with any portion of the free standing span pipe system peripheral opposite the center pivot pipe system when they are in their overlapping relation opposite the sides of the field.

19. The method of claim 10 further characterized by and including the step of turning the free standing span pipe system through a corner of the field when the sides of the field intersect by slowing down the movement of the wheeled tower on the inner end relative to the speed of movement of the wheeled tower on the outer end thereof.

20. The method of claim 10 further characterized by and including the step of turning the free standing span pipe system through a corner of the field by speeding up the movement of the wheeled tower on the outer end relative to the speed of movement of the wheeled tower on the inner end thereof.

21. In an irrigation system for watering a generally polygonal shaped field having generally rectilinear sides intersecting at corners, the improvement comprising a free standing span pipe unit supported on at least two towers with non-steerable wheels on each end and sprinkling units along its length, means for moving the free standing span pipe unit along the periphery of the field while maintaining it disposed generally perpendicular to the sides of the field, a sensing mechanism on the free standing span pipe unit constructed to follow an alignment reference line extending along the periphery of the field, power means on the towers for propelling the free standing span along the side of the field, an elongated main pipe unit supported at intervals on wheeled towers with sprinklers along the length thereof positioned inside of the free standing unit and connected to a water source, power means on the towers for the main irrigation unit for propelling it, and a connecting span between the outer end of the main irrigation unit and the inner end of the free standing span pipe unit so that the connecting span and free standing span pipe unit may fold in next to and overlap the outer end of the main irrigation unit at times and may unfold and extend beyond the outer end of the main irrigation unit at other times so that an irregularly shaped field may be irrigated.

22. The structure of claim 21 further characterized in that the main irrigation unit is a center pivot type of irrigation unit.

23. A method of operating an irrigation system to irrigate a generally polygonal shaped field having rectilinear sides intersecting at corners, the system including a first free standing span lateral move pipe system supported by non-steerable wheels on each end thereof and sprinkler units along its length, and a second elongated main pipe system with sprinkler units along its length supported at intervals by wheeled towers, including the steps of positioning the free standing span lateral move pipe system adajcent the periphery of the polygonal shaped field, simultaneously sprinkling and moving the free standing span lateral move pipe system along the periphery of the field while maintaining it generally perpendicular to the sides of the field, positioning the main pipe system in the general center of the field inside of the defined path of movement of the free standing span lateral move pipe system, simultaneously moving and sprinkling with the main pipe system through a part of the field, connecting the outer end of the main pipe system to the inner end of the free standing span lateral move pipe system by a connecting span, supplying water from the main pipe system through the connecting span to the free standing span lateral move pipe system, moving the free standing span lateral move pipe system adjacent the periphery of the field along a defined path, and allowing the free standing span lateral move pipe system and connecting span to fold in next to and peripherally overlap the outer end of the main irrigation system at times and to unfold and extend beyond the outer end of the main irrigation unit at other times.

24. The method of claim 22 further characterized in that the main irrigation unit is a lateral move irrigation system.

* * * * *